United States Patent [19]
Minter

[11] Patent Number: 5,889,491
[45] Date of Patent: Mar. 30, 1999

[54] CALIBRATION FOR PILOT WARNING SYSTEM

[76] Inventor: Jerry B. Minter, 48 Normandy Heights Rd., Convent Station, N.J. 07961

[21] Appl. No.: 906,321

[22] Filed: Aug. 5, 1997

[51] Int. Cl.[6] ............................... G01S 3/02; G01S 5/02
[52] U.S. Cl. ............................ 342/174; 342/30; 342/462
[58] Field of Search .................................. 342/173, 174, 342/29, 30, 432

[56] References Cited

U.S. PATENT DOCUMENTS

| | | | |
|---|---|---|---|
| 4,916,451 | 4/1990 | Ishita | 342/35 |
| 5,223,847 | 6/1993 | Minter | 342/417 |
| 5,506,590 | 4/1996 | Minter | 342/462 |
| 5,541,608 | 7/1996 | Murphy et al. | 342/442 |
| 5,629,692 | 5/1997 | Stayton et al. | 340/961 |

*Primary Examiner*—Mark Hellner
*Attorney, Agent, or Firm*—Morrison Law Firm

[57] ABSTRACT

A calibration system for a pilot warning system includes first and second calibration antennas spaced apart on an aircraft. The first and second calibration antennas receive the same pulsed RF signal, suitable delayed so that, after emission from the calibration antennas, the pulsed signal is received at times at antennas of the pilot warning system appropriate to indicate that a simulated target is within or outside (up or down) an elevation angular band of interest. Adjustment of relative timing is made by inducing relative transmission delays of the pulsed signal on its way to the two antennas. In one embodiment, different cable lengths produce the desired delays.

11 Claims, 3 Drawing Sheets

CALIBRATION FOR PILOT WARNING SYSTEM

BACKGROUND

The present invention relates to pilot warning systems and, more particularly, to a calibration technique for a pilot warning system that employs time-of-arrival, amplitude or phase comparison to determine the direction to a source of electromagnetic radiation.

My prior U.S. Pat. Nos. 5,506,590 and 5,223,847 disclose a passive system for determining the location of an emitting radio source. The system measures the azimuth and elevation angles of arrival, with respect to the deck of an aircraft, of transponder signals emitted by airborne targets in which a pilot of an aircraft may be interested.

These systems in these prior patents, particularly the measurement of elevation angle, depend on relatively small differences in time of arrival of received signals to derive the required data.

Azimuth to a target aircraft is preferably determined by comparing the outputs of four separate receiver channels. A technique is disclosed wherein an array of four antennas surrounding a parasitic center element feed four separate receivers respectively. The center element is initially floating so that the four antennas are substantially omnidirectional. The base of the center element is grounded midway through a received pulse to increase the received intensity along a line from the center element to the one of the four antennas closest to the target bearing. The increase in received strength, although theoretically about a factor of 2, because of inevitable losses, is closer to a factor of about 1.8. The one of the receivers exhibiting such an increase in received signal strength beginning at the switching time indicates the azimuth of the emitting target. One skilled in the art will recognize that more than four azimuth angles can be detected using interpolation of signals on more than one receiver.

A calibration technique for the measurement device for elevation and azimuth angles is not disclosed in my prior patents.

OBJECTS AND SUMMARY OF THE INVENTION

It is an object of the present invention to provide a calibration system for a pilot warning system that avoids the drawbacks of the prior art.

It is a further object of the present invention to provide a calibration system for a pilot warning system that is useable in flight.

It is a still further object of the present invention to provide a calibration system for a pilot warning system that minimizes interference with radio reception of other aircraft.

It is a further object of the invention to provide two spaced-apart antennas having directivity appropriate to maximize own-ship reception while minimizing radiated power in undesired directions.

Briefly stated, the present invention provides a calibration system for a pilot warning system which includes first and second calibration antennas spaced apart on an aircraft. The first and second calibration antennas receive the same pulsed RF signal, suitable delayed so that, after emission from the calibration antennas, the pulsed signal is received at times at antennas of the pilot warning system appropriate to indicate that a simulated target is within or outside (up or down) an elevation angular band of interest. Adjustment of relative timing is made by inducing relative transmission delays of the pulsed signal on its way to the two antennas. In one embodiment, different cable lengths produce the desired delays.

According to an embodiment of the invention, there is provided a calibration for a pilot warning system, the pilot warning system employing a first antenna on a first surface of an aircraft and a second antenna on a second, opposed, surface of the aircraft, the pilot warning system being of a type that employs relative time-of-arrival of pulsed signals at vertically spaced-apart locations of the first and second antennas to determine an elevation angle of an emitter, comprising: third and fourth antennas on the aircraft, the third antenna being positioned for a signal emitted therefrom to be preferentially received by the first antenna, the fourth antenna being positioned for a signal emitted therefrom to be preferentially received by the second antenna, a source of a pulsed radio frequency signal, connection means for connecting the pulsed signal to the third and fourth antennas, and the connection means including at least one delay device for establishing a relationship between arrival times of the signal at the first and second antennas.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
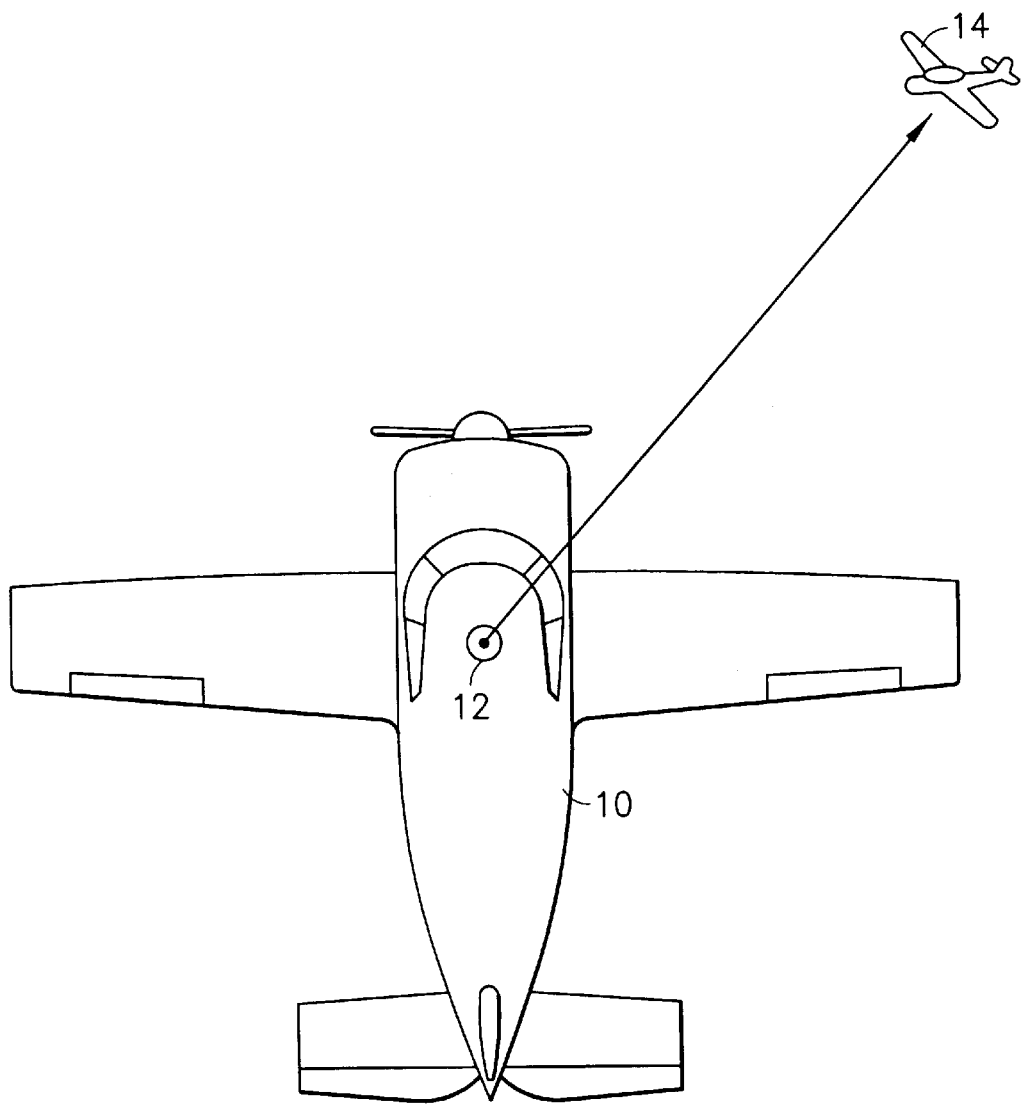
FIG. 1 is a top view of an aircraft and target to which reference will be made in describing angle discrimination according to an embodiment of the invention.

Referring now to FIG. 1, an aircraft 10 includes a five-element antenna array 12 according to my prior patents and applications, the disclosures of which are herein incorporated by reference. As fully detailed in the referenced materials, antenna array 12 includes a central quarter-wave antenna the base of which is grounded momentarily to a ground plane midway during the reception of a 1090 mHz ATCRBS (Air Traffic Control Radar Beacon System) or TCAS signal. The central antenna is surrounded by four additional quarter-wave antennas (not shown in detail in the figure), each connected to its own receiver channel. When the center antenna is ungrounded, each of the four surrounding antennas has essentially an omnidirectional pattern characteristic of a quarter-wave antenna. When the base of the central antenna is grounded, the pattern for each of the four surrounding antennas changes to the directional pattern characteristic of a two-element parasitic array. In such a parasitic array, the signal strength of a target along a line from the central antenna through one of the four surrounding antennas is enhanced, while the signal strength of a target in the opposite direction is reduced on the same antenna. A switching device in aircraft 10 periodically connects the base of the central quarter-wave antenna to the ground plane to form momentarily a two-element parasitic array for reception of a beacon transponder (ATCRBS) or TCAS signal emitted by a target aircraft 14. The azimuth direction to radio-emitting target aircraft 14 is determined by comparing the amplitudes of the signals received on the four different two-element parasitic antenna arrays.

As fully detailed in my prior patents and applications, advantage can be taken of the fact that a beacon transponder or TCAS signal includes a pair of 0.45 microsecond framing pulses spaced exactly 20.3 microseconds apart. Data pulses between the framing pulses are variable, depending on the mode and the transmitted data, but the framing pulses themselves are constant. In the present invention, the data pulses are ignored, and only the two framing pulses are used. When a 1090 MHz pulse of 0.45 microseconds duration is received, a gate is enabled 20.3 microseconds after the onset of this pulse. If a second pulse occurs during the gate, there is a high probability that this second pulse is the second framing pulse of a beacon or TCAS signal. This permits easy timing for the switching of the base of the central antenna at 20.55 microseconds after the onset of the first pulse (20.3 microseconds interpulse period plus about 0.35 microsecond, a little more than half the 0.45 microsecond pulse width to place the switchover within the second pulse period).

Figure 2:
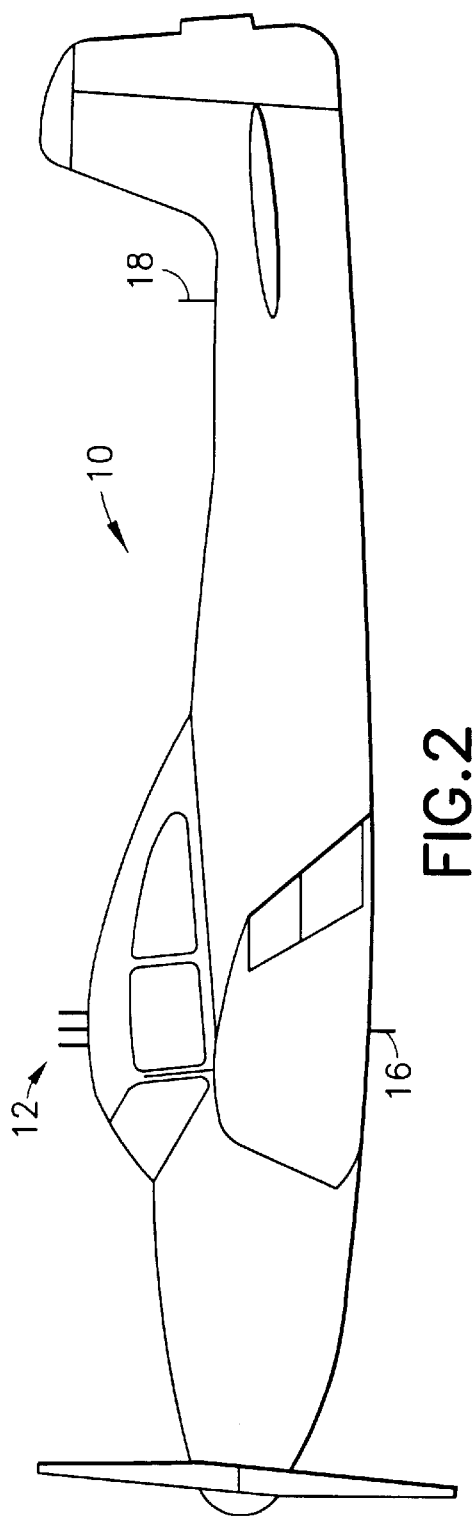
FIG. 2 is a side view of an aircraft to which reference will be made is describing elevation angle discrimination according to an embodiment of the invention.

Referring now to FIG. 2, in my prior U.S. patent application Ser. No. 85,023, I disclose a technique, used with the above azimuth-directional array, for determining the elevation, relative to the deck angle of aircraft 10, of a radio-emitting source. This technique adds a single antenna 16 vertically displaced downward from antenna array 12. In a typical general-aviation aircraft, the vertical displacement between the top of a cockpit and the bottom of the aircraft is sufficient to permit time-of-arrival discrimination with relatively simple circuits. A vertical angle detection device employs the difference in time of arrival of pulse signals at the antenna array 12 and at single antenna 16 to identify signals originating within an elevation angle range of interest. For purposes of description, the elevation angle range of interest is taken to be plus or minus seven degrees, which relates to plus or minus 1000 feet at two miles. That is, if an emitter is discerned within±seven degrees of the deck angle of aircraft 10, it triggers an alarm indication, otherwise, it's significance is downgraded. This alarm capability may be enhanced using strength-is-range type ranging, as well as azimuth angle detection, as described in the referenced documents, to enhance the alerting relevance. For example, an emitter located 180 degrees off the bow (due aft) may be of as much interest as one located in the forward quadrant, since many general aviation accidents occur when one aircraft overtakes another. The aircraft being overtaken generally has poor or no visibility to the rear without rolling or turning the aircraft, and is thus vulnerable to an overtaking midair collision. Suitable warning techniques may be employed depending on the information developed.

There is a problem in testing the above system for accuracy, both for azimuth direction and elevation, particularly during flight of an aircraft on which it is installed. One possibility that the inventor considered was to install an omnidirectional quarter-wave antenna 18 on aircraft 10 to act as a test source. Although such a system could be used for this purpose, the omnidirectional signal propagation of quarter-wave antenna 18 could lead to significant interference with receivers on other aircraft or on the ground.

Figure 3:
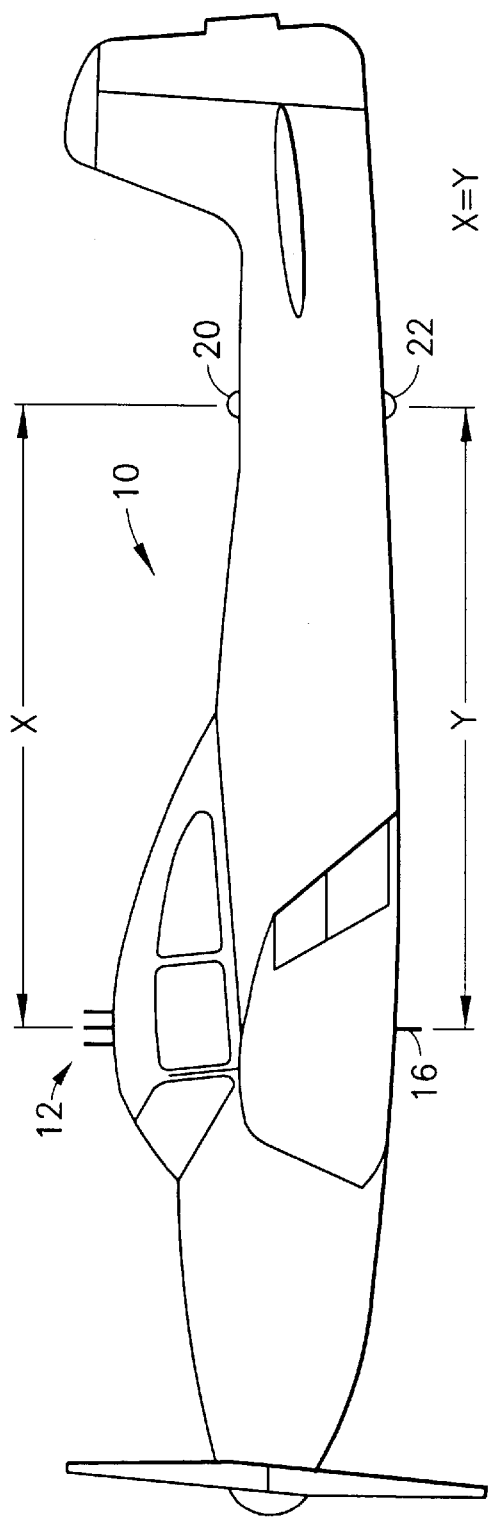
FIG. 3 is a side view of an aircraft including upper and lower directional loop antennas according to an embodiment of the invention.

Referring now to FIG. 3, aircraft 10, besides having antenna array 12 on its upper surface and antenna 16 on its lower surface, also includes an upper directional loop antenna 20 on the upper surface of the rear portion of it fuselage. Upper directional loop antenna 20 is spaced a horizontal distance X aft of the center of antenna array 12. Similarly, a lower directional loop antenna 22 is disposed on a lower surface of the rear portion of the fuselage of aircraft 10 spaced aft a horizontal distance Y from antenna 16. Preferably, X=Y.

For purposes of description, upper directional loop antenna 20 and lower directional loop antenna 22 are identical. Thus, the description of upper directional loop antenna 20 will serve as description for both.

Figure 4:
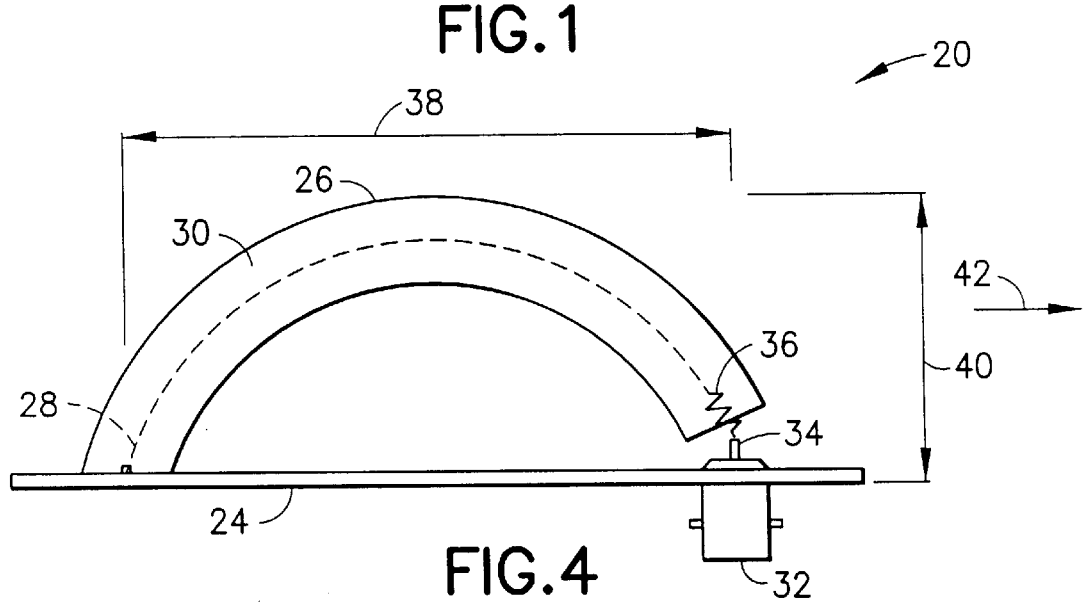
FIG. 4 is a side view of a directional loop antenna according to an embodiment of the invention.

Referring now to FIG. 4, upper directional loop antenna 20 includes a metallic ground plane 24, preferably grounded to the structure of aircraft 10. A tubular metallic outer conductor 26 and a metallic coaxial inner conductor 28 of an arcuate conductive coaxial antenna loop 30 are shorted together at one end and electrically connected to metallic ground plane 24. A gap 34 is formed between the distal end of coaxial antenna and ground plane 24. A suitable electrical connector 32 passes through ground plane 24 and into gap 34. A 90-ohm resistor 36 is connected in series between connector 32 and metallic coaxial inner conductor 28.

The impedance of upper directional loop antenna 20 is quite low. Therefore, the series impedance of 90-ohm resistor 36 substantially dominates the impedance seen at connector 32. It is therefore convenient to feed upper directional loop antenna 20 with 90-ohm coaxial cable.

For the ATCRBS and TCAS operating frequency of about 1090 mHz, a horizontal dimension 38 of about 3.5 inches and a vertical dimension 40 of about 2 inches provides suitable operation of upper directional loop antenna 20. Two radiation fields are generated—the "H" field generated by the inner conductor 28 and the "E" field generated by the closely coupled outer conductor or shield 26. The phasing of these two fields is such that maximum radiation occurs in the direction indicated by an arrow 42 toward the connector 32.

Referring now also to FIG. 3, upper directional loop antenna 20 is disposed on aircraft 10 so that arrow 42 points forward toward antenna array 12. Similarly, lower directional loop antenna 22 is disposed below aircraft 10 with its maximum radiation directed toward antenna 16 on the belly of aircraft 10.

Figure 5:
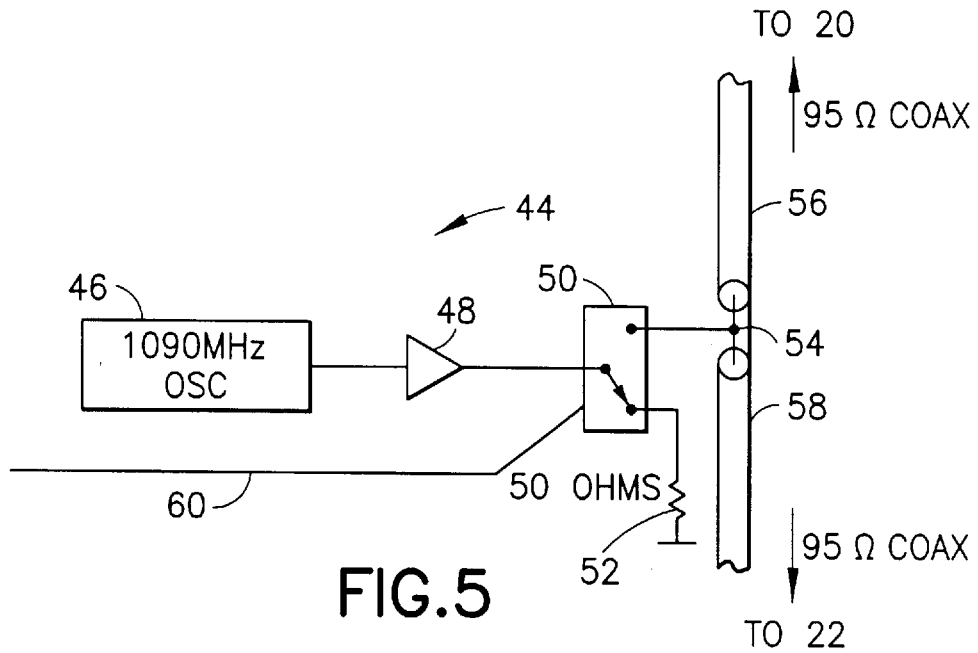
FIG. 5 is a block diagram of a driver for controlling application of RF to the directional loop antennas of FIG. 3 to simulate a same-altitude target.

Referring now to FIG. 5, there is shown, generally at 44, a driver according to one embodiment of the invention. Driver 44 includes a free-running oscillator 46 producing a radio frequency at 1090 MHz. The output of oscillator 46 is applied through a buffer amplifier 48 to an input of an electronically controlled switch 50. One output of electronically controlled switch 50 is connected through a 50-ohm resistor 52. The other output of electronically controlled switch 50 is connected to a tap 54 on the center conductor of joined 95-ohm coaxial cables 56 and 58. The shields of coaxial cables 56 and 58 are connected together. Coaxial cable 56 is connected to connector 32 (FIG. 4) of upper directional loop antenna 20. Coaxial cable 58 is similarly connected to the connector of lower directional loop antenna 22. A control line 60 applies pulsed signals to electronically controlled switch 50 to switch the output of oscillator 46 from resistor 52 to tap 54. The signals at a frequency of 1090 mHz have a pulse width and pulse spacing effective to simulate an ATCRBS or TCAS emitter.

The impedance seen at tap 54 is approximately half the 95-ohm impedance of coaxial cables 56 and 58. That is, the impedance at tap 54 is approximately 50 ohms. Therefore, buffer amplifier 48, during switching of electronically controlled switch 50 between resistor 52 and tap 54 sees approximately the same load impedance. Oscillator 46 remains free-running during use. These two conditions avoid frequency instability from oscillator 46 due to start-up or load switching.

Assuming that the lengths of coaxial cables 56 and 58 are equal, and that the effective distance between upper directional loop 20 and antenna array 12 is equal to the distance between lower directional loop antenna 22 and antenna 20, the 1090 mHz signals will be received at the same time. The angular detection system of my prior patents will interpret this simultaneous arrival of signals as being from a target at the same altitude as aircraft 10. This will produce a maximum alert. Advantageously, the signal received on antenna array 12 is available to test the directional capability of the system. If antenna array 12 is made rotatable, then, during calibration, antenna array 12 can be rotated until the maximum signal is indicated. Then, antenna array 12 may be fastened in the position found by this calibration. In the example here, the azimuth indication should be 180 degrees (directly astern). As will be discussed later, other antenna positions may provide other azimuth indications.

If the distances X and Y (FIG. 3) between the upper and lower calibration loops and their respective operating antennas are not equal, compensation can be accomplished by adjusting the relative lengths of coaxial cables 56 and 58 so that pulses are received at the upper and lower antennas at substantially the same time.

Besides testing that an emitter that is simultaneously received produces a same-altitude indication, it is useful to test whether an emitter at angular thresholds above and below the aircraft produce the desired indications.

Figure 6:
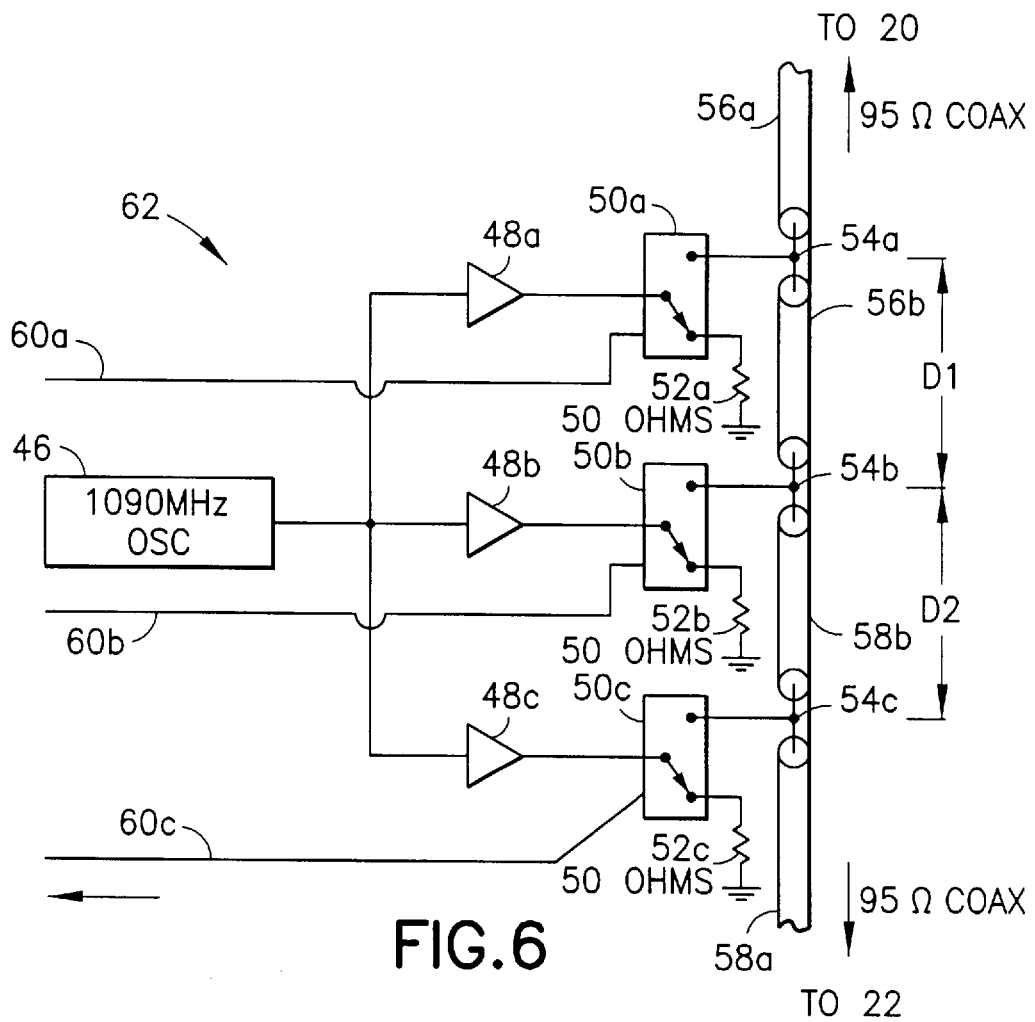
FIG. 6 is a block diagram of a driver for controlling application of RF to the directional loop antennas of FIG. 3 to simulate same-altitude as well as threshold elevation-angle and depression-angle targets.

Referring now to FIG. 6, there is shown, generally at 62, a driver which, in addition to testing for same-altitude indication, also tests for signals having time of arrival differences above or below upper and lower limits. Oscillator 46 feeds 1090 mHz signals in parallel to buffers 48a, 48b and 48c. Each buffer feeds a respective electronically controlled switch 50a, 50b and 50c. One output of each of electronically controlled switches 50a, 50b and 50c is connected to its respective 50-ohm resistor 52a, 52b and 52c. The other output of each electronically controlled switch 50a, 50b and 50c is connected to its respective tap 54a, 54b and 54c. Control lines 60a, 60b and 60c control the output positions of their respective electronically controlled switches.

Coaxial cable 56 of the embodiment of FIG. 5 is split into two portions, 56a and 56b, with tap 54a at their junction. Similarly, coaxial cable 58 of the embodiment of FIG. 5 is split into two portions 58a and 58b with tap 54c at their junction. In addition, tap 54b is located between coaxial cable portions 56b and 58b. The length of portion 56b is indicated as D1, and the length of portion 58b is indicated as D2. In one embodiment D1=D2.

Assuming that the effective lengths of coaxial cable portions 56a and 56b and coaxial cable portions 58a and 58b are substantially equal, when electronically controlled switch 50b is actuated to feed pulses of 1090 mHz radio frequency to tap 54b, a same-altitude indication is generated in the same manner as in the embodiment of FIG. 5. In contrast, when electronically controlled switch 50a is actuated to apply RF to tap 54a, the cable distance to upper directional loop antenna 20 is shorter by the distance D1+D2 than the cable distance to lower directional loop antenna. Similarly, when electronically controlled switch 50c is energized to feed RF to tap 54c, the cable distance to lower directional loop antenna is shorter by the distance D1+D2. Proper selection of the distances D1 and D2 places the apparent elevation angle of the simulated target at any desired calibration angle. For purposes of definiteness, one embodiment of the invention sets distances D1=D2=6 inches. On a medium-sized general-aviation aircraft, this simulates an elevation/depression angle of about 7 degrees.

Control of simulated elevation angle using three taps in coaxial cable is a convenient and low-cost expedient, but is not the only possibility. For example, a continuously variable delay line may be used. In addition, an electronically controlled delay using, for example, ferrite rotators, quartz crystals, etc. may be substituted for the coaxial taps without departing from the spirit and scope of the invention.

The output radiated power from upper directional loop antenna 20 may be used as a calibration for a strength-is-range type ranging system. A signal strength of about 300 microvolts corresponds approximately to an ATCRBS transponder at about 2 miles, assuming that the transponder emits at standard output power. The system of my prior disclosures may include a gain adjustment to trigger an alarm indication at the level received from the calibration source. As is explained in the references, the output power of a TCAS system is less reliable as an indicator of range since a power turn-down is built into the system in busy terminal areas.

Although the present invention is described using upper and lower directional loop antennas 20 and 22, located straight aft of antenna array 12 and antenna 16, this arrangement is not a necessary limitation on the present invention. Adequate calibration is possible using a pair of quarter-wave antennas (not shown) installed in the same locations as directional loop antennas 20 and 22. As previously explained, directional loop antennas 20 and 22 tend to reduce effective radiated power in undesired directions. However, limiting the input power to a pair of quarter-wave antennas to, for example, one milliwatt, may be sufficient to limit interference to other aircraft and the ground.

Some aircraft may not provide suitable mounting places for upper and lower calibration antennas due aft of the system antennas, as is disclosed herein. For example, some helicopters have only slim booms extending to their tail rotors. Antenna separation on such a boom may be insufficient, and shadowing by the helicopter body may be insufficient to permit maximum reception at upper antenna 16 from the upper directional loop antenna 20 and while having maximum reception by the quarter-wave antenna 18 from lower directional loop antenna 22. Other mounting locations may be employed. For example, the calibration antennas may be mounted above and below a wing at a known angle off the stem. A tailless aircraft may permit mounting the calibration antennas at 90 degrees from the fore/aft axis. In the case of a blimp, since the gas bag is substantially radio transparent, mounting the calibration antennas on the top and bottom of the gas bag may not be acceptable due to insufficient shadowing. However, the gondola of a blimp may provide suitable mounting places. In this case, one of the calibration antennas may be disposed within the gas bag. It may turn out that the most convenient location for the calibration antennas may be forward of the system antennas. Such a forward location is suitable, although appropriate interpretation of the data for azimuth and elevation angle is necessary, as would be understood by one skilled in the art.

One feature of the invention, as disclosed above, is the ability enabled to perform in-flight alignment and testing of the warning system. However, an embodiment of the invention is contemplated using temporarily mountable antennas (either dipoles or directional loop antennas) are affixed either on, or in the proximity of, the aircraft for initial calibration and/or alignment. Once the system is tested and/or aligned, the temporary antennas may be removed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Calibration for a pilot warning system, said pilot warning system employing a first antenna on a first surface of an aircraft and a second antenna on a second, opposed, surface of said aircraft, said pilot warning system being of a type that employs relative time-of-arrival of pulsed signals at vertically spaced-apart locations of said first and second antennas to determine an elevation angle of an emitter, comprising:

third and fourth antennas on said aircraft;

said third antenna being positioned for a signal emitted therefrom to be preferentially received by said first antenna;

said fourth antenna being positioned for a signal emitted therefrom to be preferentially received by said second antenna;

a source of a pulsed radio frequency signal;

connection means for connecting said pulsed signal to said third and fourth antennas; and said connection means including at least one delay device for establishing a relationship between arrival times of said signal at said first and second antennas.

2. A calibration according to claim 1, wherein said connection means includes at least one cable, said at least one cable being effective for producing a delay effective for establishing said relationship.

3. A calibration according to claim 1, wherein said relationship includes at least one of substantial coincidence, early arrival at said first antenna, and early arrival at said second antenna.

4. A calibration according to claim 1, wherein said relationship includes said arrival times being within a time effective for said pilot warning system to detect a simulated target within an elevation angle of interest.

5. A calibration according to claim 1, wherein said relationship includes said arrival times being different enough for said pilot warning system to detect a simulated target outside an elevation angle of interest.

6. A calibration according to claim 1, wherein said connection means includes:

a first cable from said source to said third antenna;

a second cable from said source to said fourth antenna; and a relationship between lengths of said first and second cables being effective to establish said relationship.

7. A calibration according to claim 6, wherein said lengths are substantially equal.

8. A calibration according to claim 6, wherein said second cable is sufficiently longer than said first cable that said pilot warning system detects a simulated target above or below predetermined upper or lower threshold.

9. A calibration according to claim 1, wherein said second and third antennas are affixed to said aircraft for calibration of said pilot warning system in flight.

10. A calibration according to claim 1, further comprising:

said first antenna being rotatable; and said pilot warning system being of a type which indicates an azimuth angle of a target with respect to an angle of said antenna.

11. A calibration according to claim 1, wherein said third and fourth antennas are directional loop antennas, said third antenna being oriented with its directivity being directed at said first antenna and said fourth antenna being oriented with its directivity being directed at said second antenna.

* * * * *